UNITED STATES PATENT OFFICE.

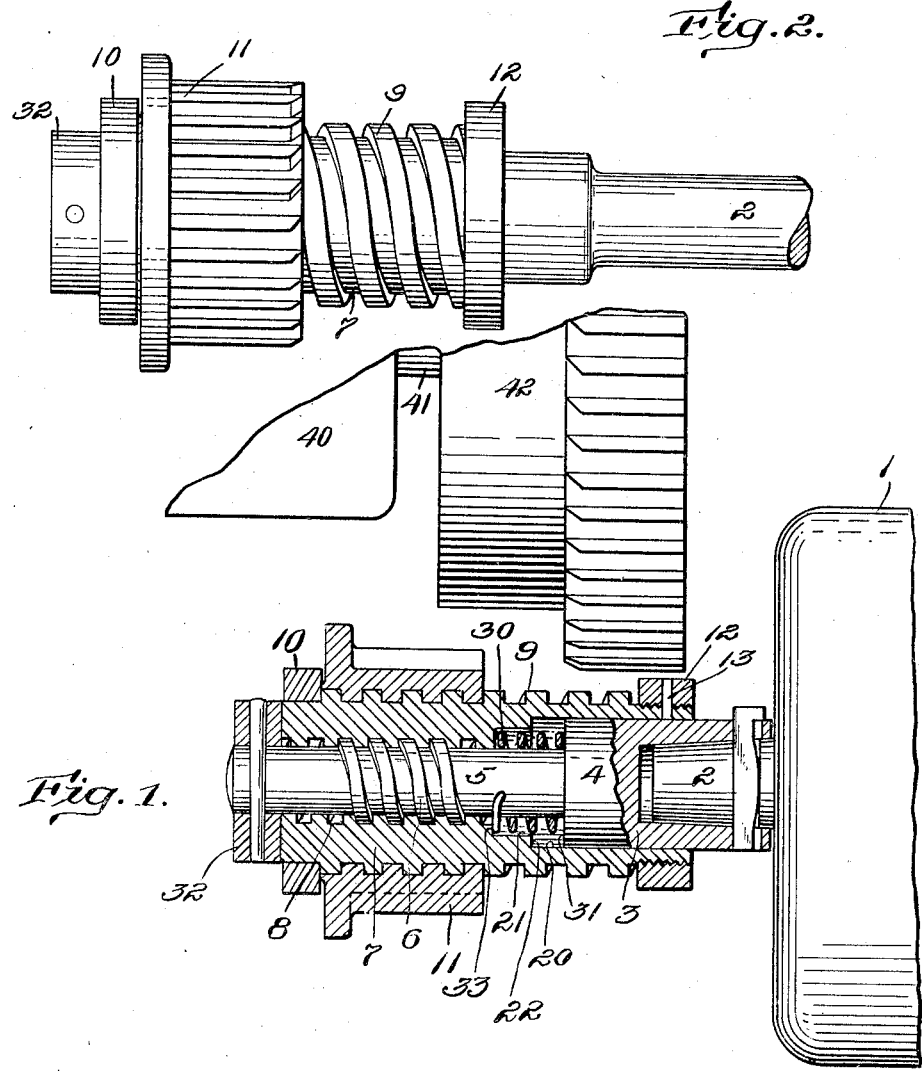

JESSE A. HOLTON, OF EAST ORANGE, NEW JERSEY, ASSIGNOR TO GRAY & DAVIS, INC., OF CAMBRIDGE, MASSACHUSETTS.

ENGINE-STARTER.

1,359,703.  Specification of Letters Patent.  Patented Nov. 23, 1920.

Application filed February 5, 1918. Serial No. 215,496.

*To all whom it may concern:*

Be it known that I, JESSE A. HOLTON, a citizen of the United States, residing at East Orange, in the county of Essex and State of New Jersey, have invented certain new and useful Improvements in Engine-Starters, of which the following is a specification.

This invention relates to engine starters and with regard to certain more specific features thereof to automatic transmission completing and interrupting devices.

It is one of the objects of the present invention to provide a reliably operative device of the character above referred to which shall be simple, compact and inexpensive in construction.

Another object resides in the incasing and reinforcing of the less durable parts and the provision of a generally strong and durable organization for the transmission of power.

Another object is to provide means whereby in completing the transmission a positive drive in one direction is maintained yet the shock of engagement is suitably cushioned without the use of clutches or slip devices.

Still another object contemplates the provision of reliably efficient spring means for assisting in the interruption of the transmission.

Other objects will be in part obvious and in part pointed out hereinafter.

The invention accordingly consists of the various features of construction, combination of elements and arrangements of parts which will be exemplified by the construction hereinafter set forth and the scope of the application of which will be indicated in the following claims.

In the accompanying drawing wherein one of various possible embodiments of the invention is shown.

Figure 1. is a view partly in section of a power transmission device including features of the invention.

Fig. 2. is a view in elevation of the transmission device shown in Fig. 1. although slightly modified in respect to the association of the transmission device with the motor.

Referring now more particularly to the drawing there is indicated at 1 an electric motor having an armature shaft 2 to which is connected an armature extension shaft or driving member 3. The latter shaft has a cylindrical body portion 4 and an attenuated shank portion 5 of smaller diameter. For a part of its length the shank 5 is provided with cam elements or threads 6 which engage with a tubular element or sleeve 7 by interior threads 8 formed in the latter.

The tubular element 7 is in the nature of an intermediate meshing and driving agency as will hereinafter appear and it is exteriorly threaded for the greater portion of its length as indicated at 9. At one end of the tube or sleeve there is a collar 10 shrunk on to serve as a limiting stop for the longitudinal movement of a driving engaging member or pinion 11 which is loosely threaded on the tube. A collar 12 is secured to the other end of the tube to serve as a limiting stop for travel of the pinion in the opposite direction. The latter said collar being threaded upon the tube, preferably, to permit adjustment and also removal of the pinion if desired. A locking device such as a pin 13 is provided to hold the collar 12 in proper position under ordinary conditions of use.

The tube 7 has a cylindrical bore 20 adapting same for a sliding fit with the body 4 of the armature shaft extension. This bore connects with one 21 of smaller diameter providing between them a right angled shoulder 22.

A compression spring 30 of flattened wire is coiled about the inner end of the reduced shank of the armature shaft extension adjacent a shoulder 31 formed by the body 4. In assembling, the spring may be twisted past the threads 6 after which the tube 7 may be threaded thereover and a limiting collar 32 pinned to the outer end of the shank. The spring 30 will bear against a wall 33 formed by the termination of the small bore and will react against the shoulder 31 tending to maintain the tube at its outermost position. It may be desirable to bend the outer end of the spring slightly inward to avoid the possibility of its catching in the interior threads of the sleeve.

An internal combustion engine is indicated at 40 having a crank shaft 41 and a gear toothed fly wheel or driven member 42. The teeth of the fly wheel and the pinion 11 are suitably beveled or pointed to facilitate meshing.

From the foregoing it will be obvious that the present invention as to certain features embodies general characteristics of an engine starting device such, for instance, as is shown in the British patent to Galloway et al. No. 6824 of 1884. In operation, however, the present device provides numerous advantages over the broad scheme of that patent, many of which will be apparent from the following description of the mode of operation of the present device.

The electric motor 1 being mounted in suitable relation to the engine, if it is desired to start the latter, the motor is energized from a suitable storage battery or other source of energy (not shown). The rotary motion of the armature shaft which ensues will be transmitted to the shaft extension 3 tending to cause the threads 6 of the shank to rotate relatively to the sleeve or tube 7. It has been found however in the embodiment shown that friction created by the spring 30 neutralizes to an extent the effect of inertia and the sleeve is picked up for rotary movement with the shaft.

Having at this point the condition of the sleeve rotating with the armature shaft the loosely threaded pinion 11 will be moved longitudinally due to its inertia until its teeth mesh with the teeth of the fly wheel gear 42. The stop 12 will limit the extent of this particular movement. It has been supposed quite generally that to obtain reliable operation in this respect the pinion must be unsymmetrical, weighted, or friction retarded. It has been found in practice, however, that the pinion may be quite symmetrical and if assembled with a loosely threaded fit the inertia characteristics is entirely sufficient.

The pinion 11 having reached the limiting collar 12 in its inward longitudinal travel has partially meshed with the fly wheel and is wedged by threads 9 in position for rotary movement with the sleeve 7. At this point with the pinion one-half or two-thirds in mesh with the fly-wheel, the latter offers a resistance which secures full meshing of the parts, inasmuch as there now takes place a relative rotary movement between the shank 5 and the sleeve 7 during which the threads 6 on the shank urge the sleeve longitudinally to a fully meshed position of the pinion.

This latter movement while positive and unyielding is nevertheless gradual and cushioned by the spring 30 which as compressed creates increasing friction until the resistance offered by the fly wheel is overcome or until the sleeve is stopped from further longitudinal travel by the shoulder 22 abutting the shoulder 31 of the armature shaft extension, under which conditions the sleeve is locked or wedged in its inward position and the pinion is locked or wedged in inward position, both, by reason of the continued rotation of the armature. All the parts will then rotate with the armature, and the fly wheel will be rotated to start the engine.

When the engine operates under its own fuel the fly wheel rotates at a much higher rate of speed causing the pinion to overrun the armature resulting in the "kicking" or "throwing out" of the pinion from its engagement with the fly wheel gear. This "kicking" also restores the sleeve to full outer position relatively to the shaft extension and it has been found desirable to make the cam or threads 6 of such pitch that the spring will insure restoration once the engine has started.

It is to be noted that the spring may assist in causing the sleeve to be rotated with the shaft at the beginning of the starting operation; that it may assist in restoring the parts to proper inactive positions, and that it serves to effectively absorb or cushion the shock of coupling or engagement. Yet the spring forms no part of the transmission or driving connection, is, therefore not likely to be broken or distorted, and is suitably incased and protected.

The entire device is exceedingly compact, and durable and if desired the extension 3 might be formed integral with the armature shaft 2 as shown in Fig. 2 of the drawing.

When the pinion has shifted to position against the inner stop a torque obtains causing a tooth thereof to bear against a tooth of the fly wheel gear. The resistance of the engine overcomes the tendency of the sleeve to rotate with the driving shaft, as heretofore stated, and the additional inward movement of the pinion which subsequently takes place is constantly under the influence of a gradually increasing torque due to the action of the threads 6 in compressing the spring 30 and the reaction of the spring on the sleeve. The engaging tooth of the pinion therefore bears with increasing force on the fly-wheel as the pinion progresses in the final step of its longitudinal meshing movement. Likewise, the resistance offered by the spring increases as the sleeve moves through this final step so that the shock of finally completing the effective driving transmission is substantially absorbed.

As many changes could be made in the above construction and as many apparently widely different embodiments of the invention could be made without departing from the scope thereof, it is intended that all matter set forth in the foregoing description or shown in the accompanying drawings shall be interpreted as illustrative and not in a limiting sense.

What I claim is:—

1. In a device of the character described, in combination, an element to be driven, three coaxial members, and means whereby one member, when rotated, causes axially forward movement of a second member into engagement with the element to be driven and subsequently causes similar movement of a third member to lock all three said members in an unyielding driving relation.

2. In a device of the character described, in combination, an element to be driven, three coaxial members, means whereby one member, when rotated, causes axially forward movement of a second member into engagement with the element to be driven and subsequently causes similar movement of a third member to lock all three said members in an unyielding driving relation, and spring means opposing one of said movements.

3. In a device of the character described, in combination, an element to be driven, three coaxial members, means whereby one member, when rotated, causes axially forward movement of a second member into engagement with the element to be driven and subsequently causes similar movement of a third member to lock all three said members in an unyielding driving relation, said means being adapted to cause disengagement of the members and the driven element upon said driven element becoming a driver.

4. In a device of the character described, in combination, a rotary driving member, a driving engaging member and an intermediate member; means comprising threads on said driving and intermediate members adapted upon rotation of said driving member to shift the driving engaging member longitudinally relatively to the intermediate member to angularly locked position thereon and to shift the intermediate member longitudinally relatively to the driving member to angularly locked position thereon.

5. In a device of the character described, in combination, a rotary driving member, a driving engaging member and an intermediate member; means comprising threads on said driving and intermediate members adapted upon rotation of said driving member to shift the driving engaging member longitudinally relatively to the intermediate member to angularly locked position thereon and to shift the intermediate member longitudinally relatively to the driving member to angularly locked position thereon, and a cushioning device adapted to act in opposition to one of the said shifts.

6. In a device of the character described, in combination, a rotatable drive shaft having a cam element thereon, a sleeve adapted to be moved longitudinally relatively to said shaft, means for causing a subsequent rotary movement of said sleeve with said shaft, a driving engaging member movable longitudinally relatively to said sleeve, cam means for causing said longitudinally shifting movement of said driving engaging member, and means for locking said engaging member to cause it to rotate with said sleeve.

7. In a device of the character described, in combination, a rotatable drive shaft having a cam element thereon, a sleeve adapted to be moved longitudinally relatively to said shaft, means for causing a subsequent rotary movement of said sleeve with said shaft, a driving engaging member movable longitudinally relatively to said shaft, means for locking said engaging member to cause it to rotate with said sleeve, and a cushioning device opposing the longitudinal movement of said sleeve.

8. In a device of the character described, in combination, a driven member, a driving engaging member normally unengaged with said driven member but adapted to engage and rotate the latter, and means adapted automatically to shift said engaging member into full engagement with said driven member and rotate the latter, said means comprising a drive shaft and an interiorly and exteriorly threaded sleeve thereon and upon the exterior threads of which sleeve said engaging member is mounted.

9. In a device of the character described, in combination, a driven member, a driving member, a driving engaging member normally unengaged with said driven member but adapted to engage and rotate the latter, means adapted automatically upon rotation of said driving member to shift said driving engaging member into full engagement with said driven member and rotate the latter, said means comprising a sleeve mounted on the driving member having provision for causing a movement of the engaging member relatively to the sleeve into partial engagement with the driven member and a subsequent movement of the sleeve relatively to the driving member to complete the engagement, and stops to limit the relative movements of said engaging member, said sleeve and said driving member.

10. In a device of the character described, in combination, a driven member, a driving engaging member normally unengaged with said driven member but adapted to engage and rotate the latter, means adapted to shift said engaging member into full engagement with said driven member and rotate the latter, said means comprising a drive shaft and an interiorly and exteriorly threaded sleeve thereon and upon which said engaging member is mounted for positive shifting movement by said exterior threads, and resilient means for cushioning the engagement of the engaging member with the driven member prior to effective rotation thereof.

11. In a device of the character described, in combination, a driven member, a driving engaging member normally unengaged with said driven member but adapted to engage and rotate the latter, means adapted automatically to shift said engaging member into full engagement with said driven member and rotate the latter, said means comprising a threaded drive shaft, a sleeve mounted thereon for longitudinal movement relatively thereto, a stop for limiting said movement, and threads on said sleeve engaging with said engaging member; and resilient means for cushioning the engagement of the engaging member with the driven member prior to effective rotation thereof.

12. In a device of the character described, in combination, a driven member, a driving engaging member normally unengaged with said driven member but adapted to engage and rotate the latter, means adapted automatically to shift said engaging member into full engagement with said driven member and rotate the latter, said means comprising a drive shaft and an interiorly and exteriorly threaded sleeve thereon and upon the exterior threads of which sleeve said engaging member is mounted; and a compression spring independent of the rotating means adapted to cushion the impact of engagement, exerting a progressively increasing influence as the engaging member moves from a position of primary engagement toward full engaging position.

13. In an engine starter, a driven member, a driving engaging member normally unengaged with said driven member, means comprising a threaded driving shaft and a sleeve threaded thereon having exterior threads engaging said driving engaging member, adapted automatically upon rotation of said shaft to cause engagement of said members and rotation thereof to start an engine and adapted upon self-operation of the engine to disengage automatically, and a resilient device serving to cushion the shock of impact at the point of effective driving engagement and adapted to assist in the automatic disengagement of the member.

14. In a device of the character described, in combination, an element to be driven, three coaxial members, means whereby one member, when rotated, causes axially forward movement of a second member into engagement with the element to be driven and subsequently causes similar movement of a third member to lock all three said members in an unyielding driving relation and spring means opposing one of said movements, both of said means being adapted to cause disengagement of the members and the driven element upon said driven element becoming a driver.

15. An engine starter comprising, in combination, a shaft provided with a body and a reduced threaded shank, a sleeve threaded on said shank, a pinion threaded upon the exterior of said sleeve, a compression spring around said shank between the body of the shaft and the sleeve, and limiting stops for movement of the sleeve on the shank and the pinion on the sleeve.

16. In starting apparatus, in combination, a driven member adapted to become a driver, a driving shaft having coaxially thereon a control member and an engaging member, means automatically operative upon rotation of said driving shaft for compelling axial movement of the engaging member into engagement with the driven member and means for thereafter transposing rotary movement of said shaft into axial movement of said control member in the same direction until the latter is locked in driving engagement, and a spring arranged to be acted upon by the control member during the action of the last said means to cushion the impact of final driving engagement.

17. In a device of the character described, in combination, a rotary driver member, a member adapted to be rotated from said driver and also adapted to be driven from another power source, power transmission devices normally disconnecting said members comprising a driving engaging member, means adapted upon rotation of said driver member to compel longitudinal shift of said driving engaging member, and means operative at the end of said longitudinal movement to compel a longitudinal movement in the same direction of the first said means and said driving engaging member.

18. In a device of the character described, in combination, a rotary driver member, a driven member adapted to become a driver, and means for coupling said members together, transmitting power between them and uncoupling said members when the driven member becomes a driver, said means comprising a driving engaging member, means automatically operative to compel a longitudinal movement of said driving engaging member when the driver member is rotated and means automatically operative to compel a further longitudinal movement of said member and the last said means to complete engagement.

19. In a device of the character described, in combination, a drive shaft, a driving engaging member, an intermediate member, the driving engaging member being shiftably mounted on the intermediate member, and the latter being shiftably mounted on the drive shaft, means adapted to transpose a rotary movement of said intermediate member into a longitudinal movement of said driving engaging member, means adapted to transpose a rotary movement of said drive shaft into a longitudinal movement of said intermediate member, and a spring opposing the longitudinal movement of said intermediate member.

20. In a device of the character described, in combination, driving means, and driven means adapted when started to become a driver of higher speed than said driving means, said driving means comprising three coaxial elements, an inner member, an intermediate member, and an outer member, and means whereby upon rotation of the inner member, the outer and intermediate members are relatively longitudinally moved, and the intermediate and inner members are given a relative longitudinal movement in the same direction to complete the transmission between the driving and driven means.

21. In a device of the character described, in combination, driving means, driven means adapted when started to become a driver of higher speed than said driving means, said driving means comprising three coaxial elements, an inner member, an intermediate member, and an outer member, and means whereby upon rotation of the inner member, the outer and intermediate members are relatively longitudinally moved, and the intermediate and inner members are given a relative longitudinal movement in the same direction to complete the transmission between the driving and driven means, and spring means for cushioning the shock of transmission completing impact.

22. In a device of the character described, in combination, driving means, driven means adapted when started to become a driver of higher speed than said driving means, said driving means comprising three coaxial elements, an inner member, an intermediate member, and an outer member, and means whereby upon rotation of the inner member, the outer and intermediate members are relatively longitudinally moved, and the intermediate and inner members are given a relative longitudinal movement in the same direction to complete the transmission between the driving and driven means, and spring means for cushioning the shock of transmission completing impact, said spring means serving to bind the inner and intermediate members of the driving means so that the outer member is first moved relatively to the intermediate member into engagement with the driven means.

23. In starting apparatus, in combination, a driven member adapted to become a driver, a driving shaft, a control member coaxial therewith, an engaging member coaxial with said driving shaft, means automatically operative upon rotation of the driving shaft for shifting the engaging member axially to engage the driven member and for subsequently transposing rotary movement of said shaft into axial movement of said control member until the latter abuts a fixed stop, whereby a positive forward driving connection of the parts is completed, and a spring for cushioning the shock of transmission completing impact acted upon by the control member during its movement toward said stop.

24. In a power transmission device for engine starters, in combination, a member driven by the engine, a driving member, a control member mounted thereon, and an engaging member arranged exteriorly of the control member, the last three members being coaxial, means for causing the control member to rotate with the shaft primarily, means on said control member for axially shifting the engaging member to an angularly locked position thereon and into partial engagement with the member to be driven, means rendered operative by the angular locking of the engaging member with the control member and the partial engagement of the former with the engine driven member adapted to axially shift the control member and engaging member in unison to complete the driving engagement.

25. In a power transmission device for engine starters, in combination, a member driven by the engine, a driving member, a control member mounted thereon, and an engaging member arranged exteriorly of the control member the last three members being coaxial, means for causing the control member to rotate with the shaft primarily, means on said control member for axially shifting the engaging member to an angularly locked position thereon and into partial engagement with the member to be driven, means rendered operative by the angular locking of the engaging member with the control member and the partial engagement of the former with the engine driven member adapted to axially shift the control member and engaging member in unison to complete the driving engagement, and a cushioning spring arranged between the control member and the driving member adapted to oppose the action of the last said means and cushion the impact of driving engagement.

JESSE A. HOLTON.